United States Patent [19]

Siegel

[11] Patent Number: 4,934,250
[45] Date of Patent: Jun. 19, 1990

[54] BRAKE BOOSTER

[75] Inventor: Heinz Siegel, Stuttgart, Fed. Rep. of Germany

[73] Assignee: Robert Bosch GmbH, Stuttgart, Fed. Rep. of Germany

[21] Appl. No.: 293,774

[22] Filed: Jan. 5, 1989

[30] Foreign Application Priority Data

Feb. 24, 1988 [DE] Fed. Rep. of Germany ....... 3805735

[51] Int. Cl.⁵ .............................................. F15B 9/10
[52] U.S. Cl. .................................. 91/378; 91/376 R; 91/374; 92/51; 92/52; 92/108; 137/625.68; 137/625.69; 60/552
[58] Field of Search ................. 91/376 R, 374, 378; 137/625.68, 625.69; 92/51, 52, 108

[56] References Cited

U.S. PATENT DOCUMENTS

| | | | |
|---|---|---|---|
| 3,815,364 | 6/1974 | Belart et al. | 91/376 R |
| 4,379,423 | 4/1983 | Leineweber et al. | 91/378 |
| 4,467,700 | 8/1984 | Udono | 91/378 R |

FOREIGN PATENT DOCUMENTS 2602050 8/1977 Fed. Rep. of Germany .
2834008 2/1980 Fed. Rep. of Germany .

Primary Examiner—Robert E. Garrett
Assistant Examiner—F. H. Stephan
Attorney, Agent, or Firm—Edwin E. Greigg

[57] ABSTRACT

A brake booster which includes a control slide that is displaceably supported in a servo piston and acted upon by a piston rod under the influence of brake pressure. The control slide has bores that establish communication between a pressure chamber and a pressure source or return for power brake fluid in the pressure chamber. The control slide is intended to penetrate a control bush in a stepped bore in the servo piston, which has a radial bore for connecting the pressure source with a radial bore in the control slide toward the pressure chamber. The control bush is supported radially movably in the stepped bore.

13 Claims, 1 Drawing Sheet

BRAKE BOOSTER

BACKGROUND OF THE INVENTION

The invention relates to a brake booster for hydraulic brakes.

Many kinds and models of brake booster are already known. The problematic areas that are always in need of improvement are, particularly, the tightness of the brake valve and the question of freedom of movement. Another goal is that the brake booster have as simple a design as possible.

German Patent No. 28 34 008, for example, shows a brake booster in which a control slide that can be acted upon by brake pressure cooperates with a servo piston. In the position of repose, the disconnection of a supply line for power brake fluid is substantially effected by a ring, which is acted upon by reservoir pressure and thus sealingly surrounds a corresponding radial bore in the control slide. However, this arrangement has the disadvantage that to seal off the inlet area from power brake fluid, additional seals must be disposed around the control slide. Upon actuation of the control slide, these seals produce increased friction, so that a strong initial force must be exerted. Moreover, the entire guidance of the slide must be manufactured such that no clamping or seizing occurs, because the control slide must run in the servo piston with very narrow play, so that the return opening will be sealed off upon braking.

OBJECT AND SUMMARY OF THE INVENTION

A brake booster having the characteristics set forth herein uses a control bush, in which a radial bore in the control bush itself is provided as a connecting bore between the power brake fluid pressure source and the pressure chamber; this control bush provides a radially movable support.

The sealing with respect to the return opening is performed by seals via which the control bush is braced against the stepped bore in the servo piston. This arrangement according to the invention assures substantially better sealing of the area from the inlet of power brake fluid to the return opening, and also makes for a substantially simpler design overall. The control slide itself is not confined by any seals, so that it can be guided in the control bush with substantially less force.

For radial motion of the control bush, it is provided that at least one seal is inclined at an angle to a transverse axis of the control bush. This creates a spacing between the two seals, in an apex region in which the radial bore itself also discharges, which is greater than the spacing in the opposed apex region of the control bush. The effect of this arrangement is that the power brake fluid that is present builds up a pressure field that acts radially upon the control push. This pressure field extends from the region of the greater spacing between the two seals to the region of the lesser spacing. The mouth of the radial bore is thereby pressed against the control bush, which produces a very good seal. This pressure field acts areally upon the control slide over a relatively large area rather than just at a point or line, which otherwise is guided freely, so that only a slight force needs to be overcome when a brake pressure is built up.

A further radial bore is preferably provided in the control bush as well, connecting a corresponding relief bore in the control slide with a transverse bore that is part of the return. For the sake of simplicity, the two radial bores are disposed side by side in the control bush, separated by a seal. This seal has a further seal associated with it in turn, on the other side of the radial bore of the return opening.

Thus, it is an essential feature of the present invention that the movement of the control slide with respect to the control bush is not hindered by any seal whatever. The seals themselves are located only between the servo piston and the control bush, in the corresponding stepped bore of the servo plunger. These seals are accordingly not subject to wear from the sliding of the control slide. They need merely assure continued sufficient sealing despite a radial displacement of the control bush. To this end, it is provided in accordance with the invention that the seals are seated in corresponding radial grooves of the control bush. The seals are preferably embodied in two parts, with an elastic O-ring seated in the radial groove itself. Seated on this O-ring is a further ring, as a sort of piston ring, which is adapted extremely precisely to the shape of the stepped bore in the servo piston. This second ring substantially takes on the task of sealing, while the control bush can be radially shifted via the O-ring. Preferably, the outer rotary seal should be made of Teflon ® or similar suitable material.

It should also be stressed that this brake booster according to the invention is extremely simple to manufacture. It has only a few parts; naturally, particular care is to be paid to the accuracy of fit of the Teflon ® rings.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
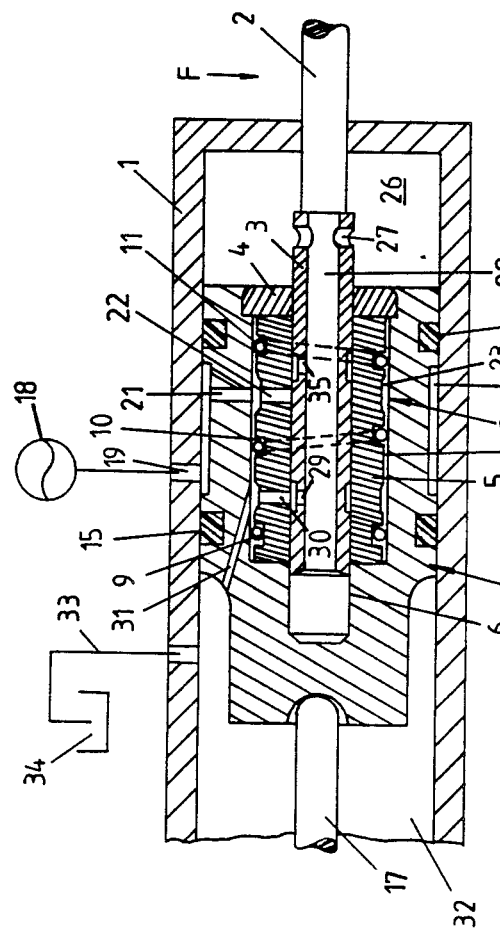
FIG. 1 is a fragmentary longitudinal section through a brake booster having corresponding supply connections shown schematically as blocks.

A housing 1 of a brake booster is penetrated by a piston rod 2 with an adjoining control slide 3. This control slide 3 penetrates both a disk 4 and a control bush 5 and then is guided by a blind bore 6 in a servo piston 7.

The guidance of the control slide 3 takes place not only in the vicinity of the blind bore 6 but also by means of the disk 4. Otherwise, the control slide 3 is connected to the piston rod 2 in a manner free of any shear force.

Figure 2:
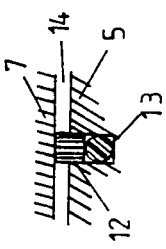
FIG. 2 is a detail on a larger scale of FIG. 1 in the vicinity of a seal.

The control bush 5 surrounds the control slide 3 between the blind bore 6 and the disk 4 and is radially supported in a floating manner in a corresponding stepped bore 8 in the servo piston 7. The control bush 5 is supported with respect to this stepped bore 8, however, via three seals 9, 10 and 11, the embodiment of which is shown in further detail in FIG. 2. In this exemplary embodiment, each seal 9, 10 and 11 comprises both a Teflon ® ring 12 and an O-ring 13 surrounded by the Teflon ® ring. This embodiment of the seals 9, 10 and 11 assures that a radial gap 14 between the servo piston 7 and the control bush 5 is spanned in a sealing manner. This radial gap 14 is necessary in order that the control bush 5 is capable of a limited extent of radial motion.

The disk 4 is fixed by crimping into the servo piston 7. The servo piston 7 is in turn supported against the inside surface of the housing 1 via two gaskets 15 and 16. The servo piston acts upon the end of a rod 17, which is connected to a brake piston, not shown in further detail.

Figure 3:
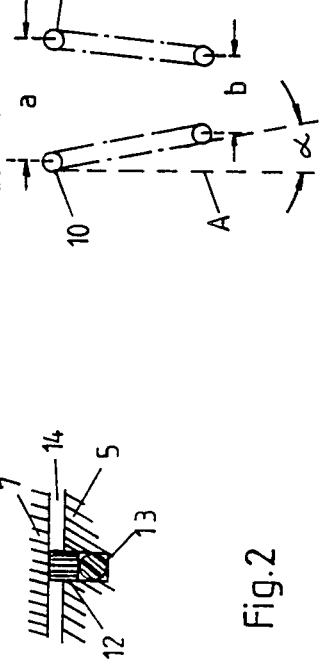
FIG. 3 is a schematic illustration of the position of two seals relative to one another.

In the position of repose of the brake booster, shown in FIG. 1, power brake fluid from a pressure source 18 is present, via a connection bore 19 in the housing 1, an annular chamber 20 formed between the servo piston 7 and the housing, a radial bore 21 in the servo piston 7, and a corresponding radial bore 22 in the control bush 5. The corresponding pressure chamber 23 between the control bush 5 and the servo piston 7 is sealed off by the seals 10 and 11. These seals 10 and 11 are in a position inclined toward one another, as shown in FIG. 3. The seal 10 extends inclined at least at an angle α with respect to a transverse axis A of the control bush 5. In the exemplary embodiment of FIG. 3, the seal 11 is also inclined, but this is not an absolute requirement. In any case, the inclination of the seal 10 has the effect that the spacing a between the seals 10 and 11 at the upper apex of the control bush 5, or in other words where the radial bore 22 is disposed, is larger than the spacing b between the seals 10 and 11 at the lower apex, that is, approximately opposite the radial bore.

Figure 4:
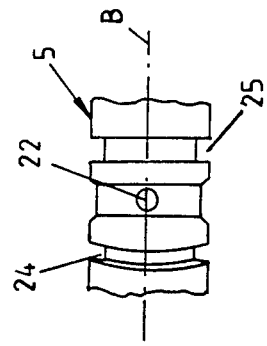
FIG. 4 is a plan view of a detail of a control bush.

The corresponding elliptical disposition of the radial groove 24 for the seal 10 is shown in further detail in FIG. 4. Here, the radial groove 25 for the seal 11 also extends in a plane at right angles to the longitudinal axis B of the control bush 5.

Because of this arrangement of the seals 10 and 11, a pressure field is built up by means of which the control bush 5 is pressed onto the control slide 3, particularly in the vicinity of the radial bore 22, so that no leakage along the control bush 5 or control slide 3 is possible. The slight radial motion of the control bush 5 in the direction F required for this purpose is unhindered, because of the radial gap 14, or in other words because of the composition of the seals 9, 10 and 11.

In this position of repose shown in FIG. 1, a pressure chamber 26 for the servo piston 7 communicates with a brake chamber 32 via bores 27, an axial bore 28 penetrating the control slide 3, a relief bore 29, a radial bore 30 corresponding with the relief bore 29 in the control bush 5, and an angular bore 31 through the servo piston 7. A line 33 leads out of this brake chamber 32 and discharges into a suitable supply container 34.

Now if the control slide 3 is acted upon by a brake force via the piston rod 2 which moves the control slide within blind bore 6, then the relief bore 29 is shifted relative to radial bore 30, disrupting the communication between the pressure chamber 26 and the brake chamber 32. Contrarily, a radial bore 35 in the control slide 3 overtakes a suitable control edge for the radial bore 22 and establishes communication between the pressure chamber 26 and the pressure source 18, in particular via the axial bore 28. As a result, the power brake fluid from the pressure source 18 is operative in the pressure chamber 26 which moves the servo piston 7 and applies a brake force onto rod 17 and the brake piston, not shown.

The foregoing relates to preferred exemplary embodiments of the invention, it being understood that other variants and embodiments thereof are possible within the spirit and scope of the invention, the latter being defined by the appended claims.

What is claimed and desired to be secured by letters Patent of the U.S. is:

1. A brake booster comprising a housing (1), a servo piston (7) in said housing, a stepped bore (8) within said servo piston, a control bush (5) secured within said stepped bore within said servo piston, a control slide (3) displaceably supported in said control bush, a piston rod (2) which acts upon the control slide under the influence of brake pressure, said housing, said servo piston, said control bush and said control slide having bores which establish communication between a pressure chamber and a pressure source and for return of a power brake fluid to a supply container, said control slide (3) penetrates said control bush (5) and is radially movably supported in said stepped bore (8) in the servo piston (7), said control bush (5) includes a first radial bore (22) for connecting the pressure source (18) with a second radial bore (35) in the control slide (3) toward the pressure chamber (26), wherein the control bush (5) is radially movably supported in the stepped bore (8), first and second seals (10 and 11) disposed between said control bush and said stepped bore on opposite sides of said radial bore (22), and said first and second seals support said control bush (5) with respect to the stepped bore (8), and at least one of said first and second seals (10 or 11) is inclined by an angle (α) with respect to a transverse axis (A) of said control bush (5).

2. A brake booster as defined by claim 1, which includes a spacing (a) between said first and second seals (10, 11) at an upper apex of the control bush (5), where said first radial bore (22) discharges, and said spacing (a) is greater than a spacing (b) at the opposite apex of the control bush.

3. A brake booster as defined by claim 1, in which said control bush (5) includes a third radial bore (30), which connects a relief bore (29) in said control slide (3) with a bore (31) in said servo piston to form part of a return for fluid in said pressure chamber (26).

4. A brake booster as defined by claim 2, in which said control bush (5) includes a third radial bore (30), which connects a relief bore (29) in said control slide (3) with a bore (31) in said servo piston to form part of a return for fluid in said pressure chamber (26).

5. A brake booster as defined by claim 3, which includes a third seal (9) and said first seal (10) and said third seal (9) are disposed laterally of said third radial bore (30).

6. A brake booster as defined by claim 2, which includes a third seal (9) and said first seal (10) and said third seal (9) are disposed laterally of said third radial bore (30).

7. A brake booster as defined by claim 4, which includes a third seal (9) and said first seal (10) and said third seal (9) are disposed laterally of said third radial bore (30).

8. A brake booster as defined by claim 2, in which each of said seals comprises an elastic O-ring (13) seated in a radial groove of said control bush (5), and said elastic O-ring is engaged by surrounding rotary seal (12) resting on said stepped bore (8).

9. A brake booster as defined by claim 3, in which each of said seals comprises an elastic O-ring (13) seated in a radial groove of said control bush (5), and said elastic O-ring is engaged by surrounding rotary seal (12) resting on said stepped bore (8).

10. A brake booster as defined by claim 5, in which each of said seals comprises an elastic O-ring (13) seated in a radial groove of said control bush (5), and said elastic O-ring is engaged by surrounding rotary seal (12) resting on said stepped bore (8).

11. A brake booster as defined by claim 8, in which said rotary seal (12) comprises Teflon ® or a similar wear-resistant material.

12. A brake booster as defined by claim 9, in which said rotary seal (12) comprises Teflon ® or a similar wear-resistant material.

13. A brake booster as defined by claim 10, in which said rotary seal (12) comprises Teflon ® or a similar wear-resistant material.

* * * * *